United States Patent [19]
Ross

[11] 3,778,981
[45] Dec. 18, 1973

[54] EXHAUST CLEANER

[76] Inventor: Samuel Scott Ross, 1570 Sunset Strip, Mountain Home, Idaho 83647

[22] Filed: Mar. 21, 1973

[21] Appl. No.: 343,586

Related U.S. Application Data

[63] Continuation-in-part of Ser. No. 202,291, Nov. 26, 1971.

[52] U.S. Cl................ 55/263, 55/238, 55/460, 261/17, 261/79 A, 261/DIG. 9
[51] Int. Cl............................................ B01d 47/06
[58] Field of Search................ 55/83, 92, 235–239, 55/263, 459, 460; 261/79 A, 117, 115, DIG. 76, DIG. 9; 34/79; 432/72

[56] References Cited
UNITED STATES PATENTS

| | | | |
|---|---|---|---|
| 2,064,185 | 7/1952 | Johnstone et al. | 55/238 |
| 2,807,450 | 9/1957 | Gordon | 55/238 |
| 2,969,851 | 1/1961 | Preeman | 55/238 |
| 3,063,686 | 11/1962 | Irvin | 261/DIG. 9 |
| 3,233,882 | 2/1966 | Calaceto | 55/238 |

FOREIGN PATENTS OR APPLICATIONS

| | | | |
|---|---|---|---|
| 341,058 | 1/1931 | Great Britain | 55/238 |

*Primary Examiner*—Bernard Nozick
*Attorney*—John W. Kraft

[57] ABSTRACT

The exhaust cleaner comprises a steam scrubber in communication with a source of particulate aerosols through a duct which is disposed at a tangent to the lower portion of the steam scrubber, the steam scrubber including upstandingly disposed cylindrical walls, a flat horizontally disposed enclosure wall at the uppermost terminal end of the cylindrical walls, and downwardly projecting, substantially cone-shaped walls at the lowermost terminal end of the cylindrical walls; a dependently mounted steam conduit being supplied with steam under pressure from a suitable source and having a plurality of suitably disposed exitway holes; an exitway through which condensed water and particulates are discharged at the lowermost terminal end of the cone-shaped walls; and a heat exhaust duct discharging heated gases and the like into a suitable exhaust stack.

3 Claims, 4 Drawing Figures

EXHAUST CLEANER

REFERENCE TO OTHER APPLICATION

This application is a continuation-in-part application of the copending application entitled "Exhaust Cleaner," Ser. No. 202, 291, filed Nov. 26, 1971.

FIELD OF INVENTION

The present invention relates to gas separators, and more particularly to gas separators operable to separate particulate matter carried in gases.

DESCRIPTION OF THE PRIOR ART

Exhaust cleaners intended to separate particulate aerosols include cyclone separators and scrubber separators. Cyclone separators have cylindrical, or substantially cone-shaped, side-walls. Particulate matter is separated by contacting particular aerosols with the walls of the cyclone. Particulate-bearing gases may enter from one of the terminal ends of, or at a tangent to, the sidewalls of the cyclone. Cyclones having gases entering at a tangent are generally more efficient than the end-inputting types because the particulate matter travels over a larger wall surface area. The efficiency of a simple cyclone is limited because the potential surface area with which particles contact is only the interior surface area of the cyclone walls.

Scrubbers may be conveniently divided into sprayers and impingers. Sprayers dispense liquid droplets as aerosols into the separator space. Particulate matter is separated from the gases by contacting particulate aerosols with liquid droplets in the separator. The sprayer principle is limited by the number of particles which may be contacted by the sprayed liquid droplets. Impingers generally include a body of liquid through which particulate-bearing gases are forced. To be effective, liquid must contact each particle carried in the gases. Frequently, however, particles may escape as a result of encapsulation by the gases.

Exhaust cleaners employing cyclone separators or scrubber separators generally exhaust a large proportion of the separated gas into the atmosphere. Frequently, in the case of dryers for example, heat energy is wasted by exhausting gases into the atmosphere.

Accordingly, it is an object of this invention to provide exhaust cleaner means which may include a scrubber employing liquid vapor dispensing means to provide maximum saturation to separate extremely particulate aerosols.

It is another object of this invention to provide a low pressure exhaust cleaner means in which a liquid vapor dispensing element of the scrubber and the pressure flow of particulate bearing gases are relatively low.

It is another object of this invention to provide an exhaust cleaner employing a steam scrubber which does not inhibit the flow of exhaust gases from a production apparatus and which does not inherently require gas propelling blowers, turbines, and the like.

These and other objects shall become apparent from the description following, it being understood that modifications may be made without affecting the teachings of the invention here set out.

SUMMARY OF THE INVENTION

Generally, the exhaust cleaner comprises a steam scrubber in communication with a source of particulate aerosols through a duct which is disposed at a tangent to the lower portion of the steam scrubber, the steam scrubber including upstandingly disposed cylindrical walls, a flat horizontally disposed enclosure wall at the uppermost terminal end of the cylindrical walls, and downwardly projecting, substantially cone-shaped walls at the lowermost terminal end of the cylindrical walls; a dependently mounted steam conduit being supplied with steam under pressure from a suitable source and having a plurality of suitably disposed exitway holes; an exitway through which condensed water and particulates are discharged at the lowermost terminal end of the cone-shaped walls; and a heat exhaust duct discharging heated gases and the like into a suitable exhaust stack.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
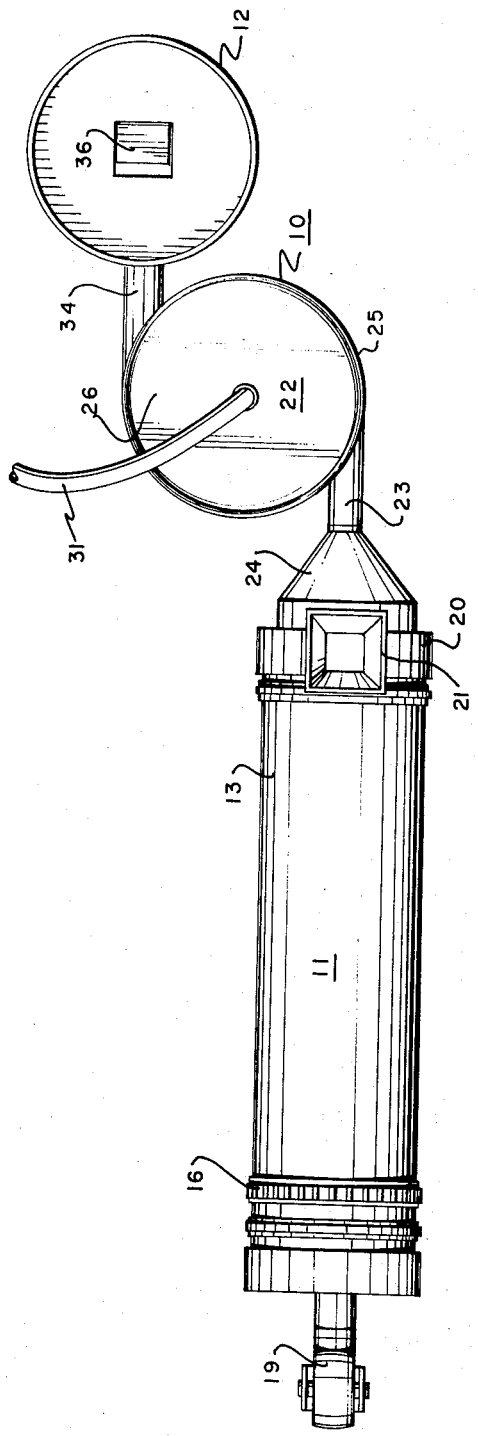
FIG. 1 is a top plan view of the exhaust cleaner of the present invention with a dryer shown for illustrative purposes.
Figure 2:
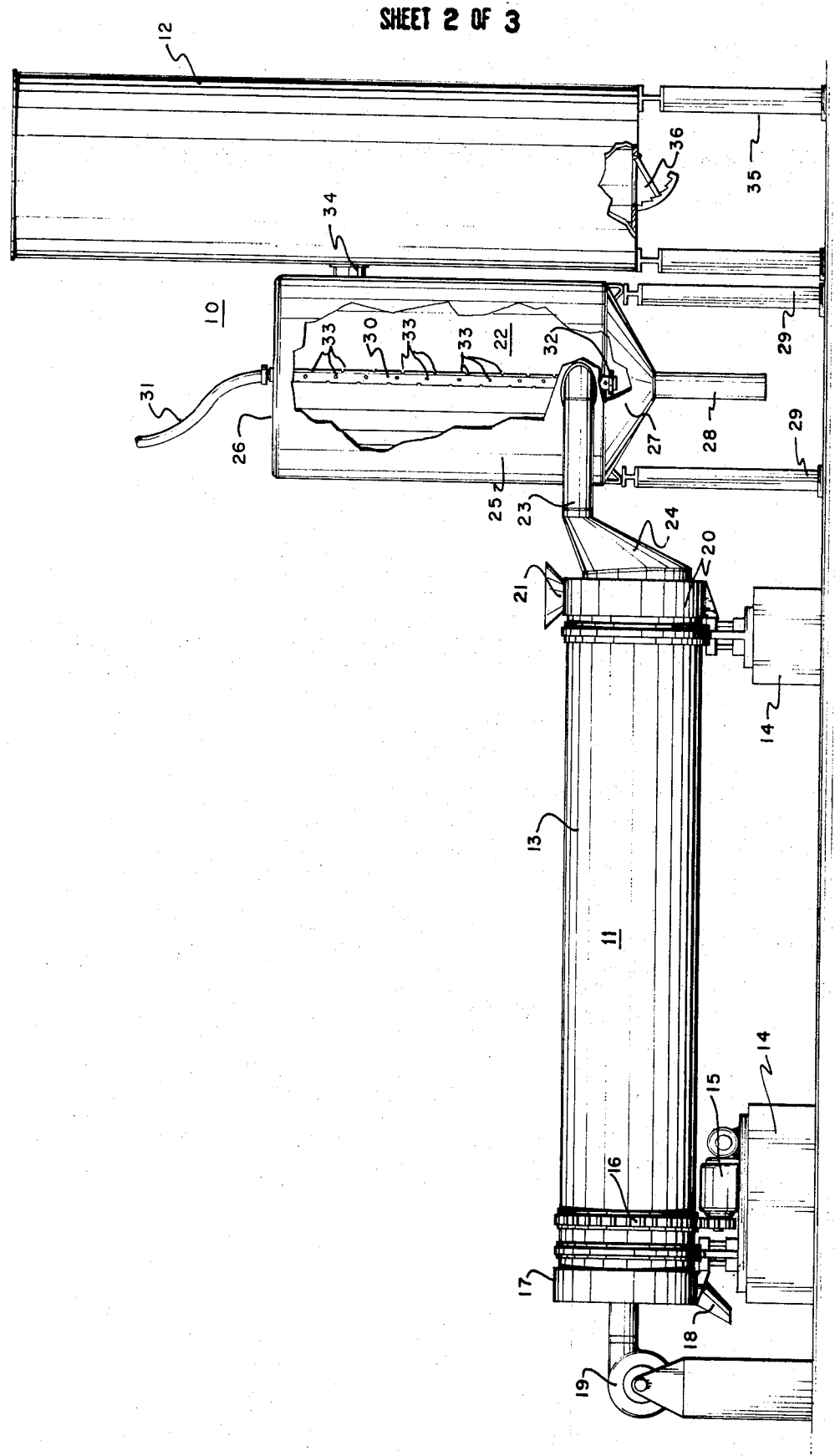
FIG. 2 is a side elevational view of the apparatus of the FIG. 1 with the walls of the baffle precleaner and the steam scrubber partially broken away to show the interior configuration thereof.

Referring now to the drawings, and more particularly to the FIG. 1, the exhaust cleaner of this invention is shown to advantage and identified by the numeral 10. The exhaust cleaner 10 is intended to be employed between a rotary kiln 11 and an exhaust stack 12. As shown more clearly in the FIG. 2, the rotary kiln 11 commonly comprises a horizontally disposed cylindrical drum 13 journaled for rotation on suitable pedestals 14. The kiln 11 is rotated by a motor 15 in cooperation with a girth gear 16 disposed about the outer circumference of the drum 13. The drum 13 is closed at one of its terminal ends by a fixedly mounted end portion 17. The end portion 17 is fastened to one of the pedestals 14 and journaled for rotation within the drum 13. The end portion 17 is provided at its lowermost terminal side with a product output discharging chute 18. The end portion 17 may be provided at its terminal end with a heated blower 19. The drum 13 is closed at its end opposite with an end portion 20. The end portion 20, in a like manner to the end portion 17, is fixedly mounted to one of the pedestals 14 and is journaled for rotation within the drum 13. The end portion 20 is provided at its uppermost terminal side with a product input hopper 21. The drum 13 may be provided with a product urging means (not shown), such as spiral blades, disposed about the interior walls of the drum 13. In operation, heated gases are moved by the blower 19 from the end portion 17 toward the end portion 20 while the product is moved in the opposite direction.

Figure 3:
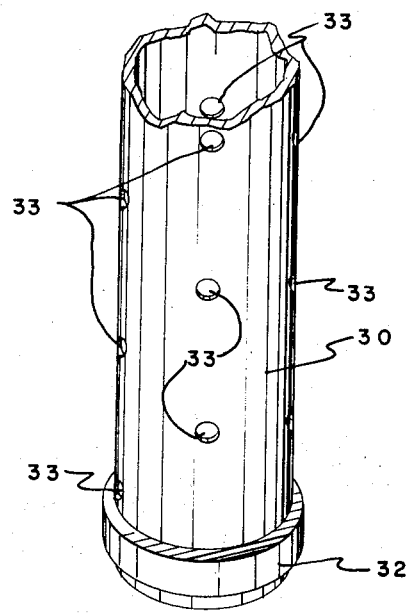
FIG. 3 is a fragmentary top perspective view of the steam conduit of the steam scrubber of this invention and showing the steam exitways disposed in spiral configuration in the conduit walls.
Figure 4:
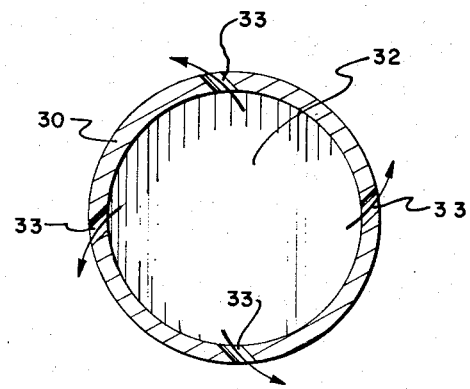
FIG. 4 is a diagrammatic view showing to advantage the interior configuration of the angularly disposed steam conduit exitways and shown with arrows indicating steam flow for illustrative purposes.

The exhaust cleaner 10 employs a steam scrubber 22. The exhaust cleaner 10 is connected to the gas discharging end portion 20 by means of a gas conducting duct 23. The end portion 20 includes an endwall 24 which is inclined upwardly at an acute angle to the vertical axis of the kiln 11. The endwall 24 is disposed in an acute angle to provide back pressure to the kiln 11. The duct 23 is a substantially cylindrical tube disposed horizontally and substantially parallel to the uppermost terminal side of the drum 13. The duct 23 is fastened to a tangent to the sidewall 25 of the steam scrubber, distally from the lowermost terminal end of the sidewall 25. The steam scrubber 22 is an upstanding, substantially cylindrical container having cylindrical sidewalls 25, a flat horizontally disposed enclosure wall 26 fastened to the uppermost terminal end of the walls 25, and cone-shaped lower walls 27 inclined downwardly from the walls 25. The lowermost terminal end of the cone-shaped walls 27 opens into a material discharging conduit 28 which empties into a suitable receptacle (not shown). The steam scrubber 22 is disposed on a suitable pedestal 29. The steam scrubber 22 includes a centrally disposed steam conduit 30 dependingly carried from the uppermost enclosure wall 26. The steam conduit 30 is supplied with steam under pressure from a suitable source (not shown) through a conduit 31. The steam conduit 30 includes an end closure means, such as a plug 32, disposed at the end opposite the conduit-engaging end, and a multiplicity of exitway holes 33. As shown more clearly in the FIG. 3, the exitways 33 are disposed in the conduit 30, at suitable intervals. It has been found to advantage to dispose the exitways 33 in a spiraling fashion to facilitate steam disbursion in the scrubber 22. As shown by the diagrammatic view in the FIG. 4, each of the exitways 33 is disposed in the conduit 30 in an angular fashion such that steam passing out of the conduit 30 through the exitways 33 will be carried in the direction of the centripetally moving gases.

In operation, small particulate aerosols are introduced through the duct 23 into the steam scrubber 22. In the steam scrubber 22, the small particulate matter acts to form a nucleus about which water vapor may condense and be carried toward the bottom of the steam scrubber 22. Water condensed in the steam scrubber 22 is then carried out of the steam scrubber 22 through the conduit 28.

Heat and water vapor are carried from the steam scrubber 22 to an exhaust stack 12 by means of a duct 34. As shown by the FIG. 1, the duct 34 is disposed with its center axis tangent to the sidewalls 25 and toward the center of the exhaust stack 12. As shown by the FIG. 2, the duct 34 is fastened to the scrubber 22 distally from its uppermost terminal end and is fastened to the exhaust stack 12 distally from its lowermost terminal end. The stack 12 is disposed in a suitable pedestal 35 which is operable to provide an air space between the lowermost terminal end of the stack 12 and the ground. As shown by the FIGS. 1 and 2, the exhaust stack 12 is provided with a damper 36 which may be selectively controlled to control atmospheric pressure in the stack 12.

It is important to note the particular flow of particulate-bearing gases in the exhaust cleaner 10. Gas under pressure from the kiln 11 is set in a centrifugal motion from the duct 23 by the cylindrical walls 25 of the steam scrubber 22. The natural upward tendency of the heated gases cause this centrifugal motion to be directed upwardly against the wall of the scrubber 22. The exitway duct 34, being connected to the upper portion of the cylindrical walls 25, increases this centrifugal turbulence in the scrubber 22. The jets of steam from the exitway holes 33 in the conduit 30 provide easily dispersed water vapor in the enclosure of the scrubber 22. The turbulence of the particulate bearing gases against the walls of the scrubber 22 and the widely dispersed water vapor cause the particulate aerosols to precipitate within the scrubber 22 to ultimately collect in the cone-shaped walls 27 and pass out through the exitway 28. The exhaust stack 12 provides increased ventilation, or drawing capacity, to the exhaust cleaner 10, and facilitates dispersion of heated gases emitted through the exitway conduit 34 and through the stack 12.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intented that the scope of the invention be limited only to the extent indicated in the appended claims.

I claim:

1. An exhaust cleaner, comprising:

a steam scrubber connected to a source of particulate-bearing gases by a conduit, said conduit being disposed at a tangent to said steam scrubber in the lower portion of its sidewall, said steam scrubber including upstanding cylindrical walls, a flat horizontally disposed enclosure wall fastened to the uppermost terminal end of said cylindrical walls, and downwardly projecting cone-shaped walls fastened to the lowermost terminal end of said cylindrical walls, said steam scrubber being provided with a condensate discharging conduit at the lowermost terminal end of said cone-shaped walls, said steam scrubber being connected to an exhaust stack by means such as a duct disposed distally from the uppermost terminal end of said steam scrubber cylindrical walls; and a steam conduit dependingly mounted from said steam scrubber enclosure wall, and closed on its end opposite said enclosure wall by a plug, and a multiplicity of suitably disposed exitways, said steam conduit being supplied with steam from a suitable source.

2. The apparatus of claim 1 including steam conduit exitways disposed in said steam conduit in a spiral configuration about the circumference of said conduit.

3. The apparatus of claim 1, wherein said conduit exitways are disposed in like angular relationship to the circumference of said conduit, said exitways being operable to direct steam out of said conduit in the same direction.

* * * * *